United States Patent
Dahle et al.

(10) Patent No.: US 7,684,141 B2
(45) Date of Patent: Mar. 23, 2010

(54) DETERMINING A REEL MOTOR ANGLE USING AN ESTIMATED INTERVAL TO DEGREES TRANSLATION FACTOR

(75) Inventors: Jacob Lee Dahle, Tucson, AZ (US); Mark Allan Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/040,419

(22) Filed: Feb. 29, 2008

(65) Prior Publication Data

US 2009/0219644 A1 Sep. 3, 2009

(51) Int. Cl.
*G11B 15/52* (2006.01)
*G11B 15/46* (2006.01)
*G11B 5/584* (2006.01)

(52) U.S. Cl. ............... 360/73.11; 360/73.04; 360/77.12
(58) Field of Classification Search ................ None
See application file for complete search history.

(56) References Cited

U.S. PATENT DOCUMENTS

| | | | |
|---|---|---|---|
| 4,977,466 A | | 12/1990 | Nakata |
| 5,689,384 A | | 11/1997 | Albrecht et al. |
| 5,815,336 A | | 9/1998 | Yim |
| 6,282,051 B1 | * | 8/2001 | Albrecht et al. ............ 360/75 |
| 6,754,026 B1 | | 6/2004 | Koski |
| 2002/0198678 A1 | * | 12/2002 | Koski et al. ................. 702/164 |
| 2004/0036428 A1 | * | 2/2004 | Bui et al. .................... 318/254 |
| 2004/0141250 A1 | | 7/2004 | Harper et al. |
| 2008/0278103 A1 | * | 11/2008 | Takeishi et al. ............. 318/430 |

OTHER PUBLICATIONS

US Application entitled "Determining Angular Position of a Tape Reel Using Timing Based Servo Format", U.S. Appl. No. 12/040,410, filed Feb. 29, 2008, by inventor M.A. Taylor.

* cited by examiner

*Primary Examiner*—Andrew L Sniezek
(74) *Attorney, Agent, or Firm*—Janaki K. Davda; Konrad Raynes & Victor LLP

(57) ABSTRACT

Provided are techniques for determining a reel motor angle. An estimate of an interval to degrees translation factor that represents a measurement angle interval divided by a first pulse count is calculated, wherein the first pulse count represents format transitions counted during an angular measurement interval. A reel motor angle is determined using the estimate by: receiving an indication that a rotating reference point has crossed a stationary reference point, wherein the indication is recognized as indicating that an angle between a motor rotor and a motor stator is a reference angle; determining a second pulse count, wherein the second pulse count represents format transitions counted since the indication was received to a given point in time; and at the given point in time, multiplying the second pulse count by the estimate to generate a first value and adding the reference angle to the first value to generate the reel motor angle.

18 Claims, 9 Drawing Sheets

US 7,684,141 B2

DETERMINING A REEL MOTOR ANGLE USING AN ESTIMATED INTERVAL TO DEGREES TRANSLATION FACTOR

CROSS-REFERENCE TO RELATED APPLICATION

This application is related to commonly owned and co-pending application Ser. No. 12/040,410 entitled "DETERMINING ANGULAR POSITION OF A TAPE REEL USING TIMING BASED SERVO FORMAT," by M. A. Taylor, filed on Feb. 29, 2008, and which is incorporated by reference herein in its entirety.

BACKGROUND

1. Field

Embodiments of the invention relate to determining a reel motor angle using an estimated interval to degrees translation factor.

2. Description of the Related Art

A host computer may be coupled to a tape drive. The host computer includes cache and executes a host application. The tape drive has tape cartridges for storing data.

With track densities increasing and tape thickness decreasing in the tape storage industry, fluctuations in tension can cause, but is not limited to, the following problems:

1. Track misplacement caused by changes in tape width due to changes in tension (Poisson's Ratio).

2. Stack quality changes (e.g., conditions, such as spoking, are related to tension fluctuations. Spoking may occur when magnetic tape is wound onto a tape reel with the tension increasing toward the end of the winding, and the higher tension on the outside of the tape causes the inner coils of the tape to buckle and deform.

The two problems listed above significantly reduce the chance that the tape drive will be capable of retrieving the data from the tape at a later time.

In tape drive systems, reel motors control the tape motion and tape tension. Precision control of the reel to reel motors enables more accurate and consistent tape tension, which can improve the head to tape interface and minimize tape damage. Such precision control also allows the drive to operate at higher tape velocities without tape damage.

One of the sources of tension fluctuations may be found in the reel motors within the tape drive. This is due to the variation in the torque that a reel motor produces as the motor rotates. This torque ripple occurs as the magnets align with the field windings. A technique of motor control called Field Oriented Control, also called Vector Control, which is capable of maintaining a force whose direction is tangent to the rotor, may be used to reduce torque ripple and to enable more efficient control of brushless DC motors (BLDC motors). These control techniques are able to apply current to the motor in a way that gives a more controlled, smooth torque. However, one of the variables in these control techniques is the angular position of the motor (also referred to as a reel motor angle), which is used so that currents can be appropriately applied to the motor windings. In particular, different currents are applied to the motor windings such that these different currents cause a certain magnetic field, and these currents are adjusted as the motor turns. The angular position may be described as an amount of rotation from an origin (e.g., x degrees/360 degrees, which is a fraction ranging from zero to one) or angular position may be described in degrees ranging from zero to 360. Usually, the angular position of the motor is provided by an encoder attached to the reel motor. However, encoders tend to be expensive components, and, in order to keep the cost of the tape drive down, there are no encoders on the reel motors in a tape drive.

Thus, there is a need in the art for improved determination of an angular position of a tape reel.

SUMMARY OF EMBODIMENTS OF THE INVENTION

Provided are a method, computer program product, and system for determining a reel motor angle. An estimate of an interval to degrees translation factor that represents a measurement angle interval divided by a first pulse count is calculated, wherein the first pulse count represents format transitions counted during an angular measurement interval. A reel motor angle is determined using the estimate by: receiving an indication that a rotating reference point has crossed a stationary reference point, wherein the indication is recognized as indicating that an angle between a motor rotor and a motor stator is a reference angle; determining a second pulse count, wherein the second pulse count represents format transitions counted since the indication was received to a given point in time; and at the given point in time, multiplying the second pulse count by the estimate to generate a first value and adding the reference angle to the first value to generate the reel motor angle.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
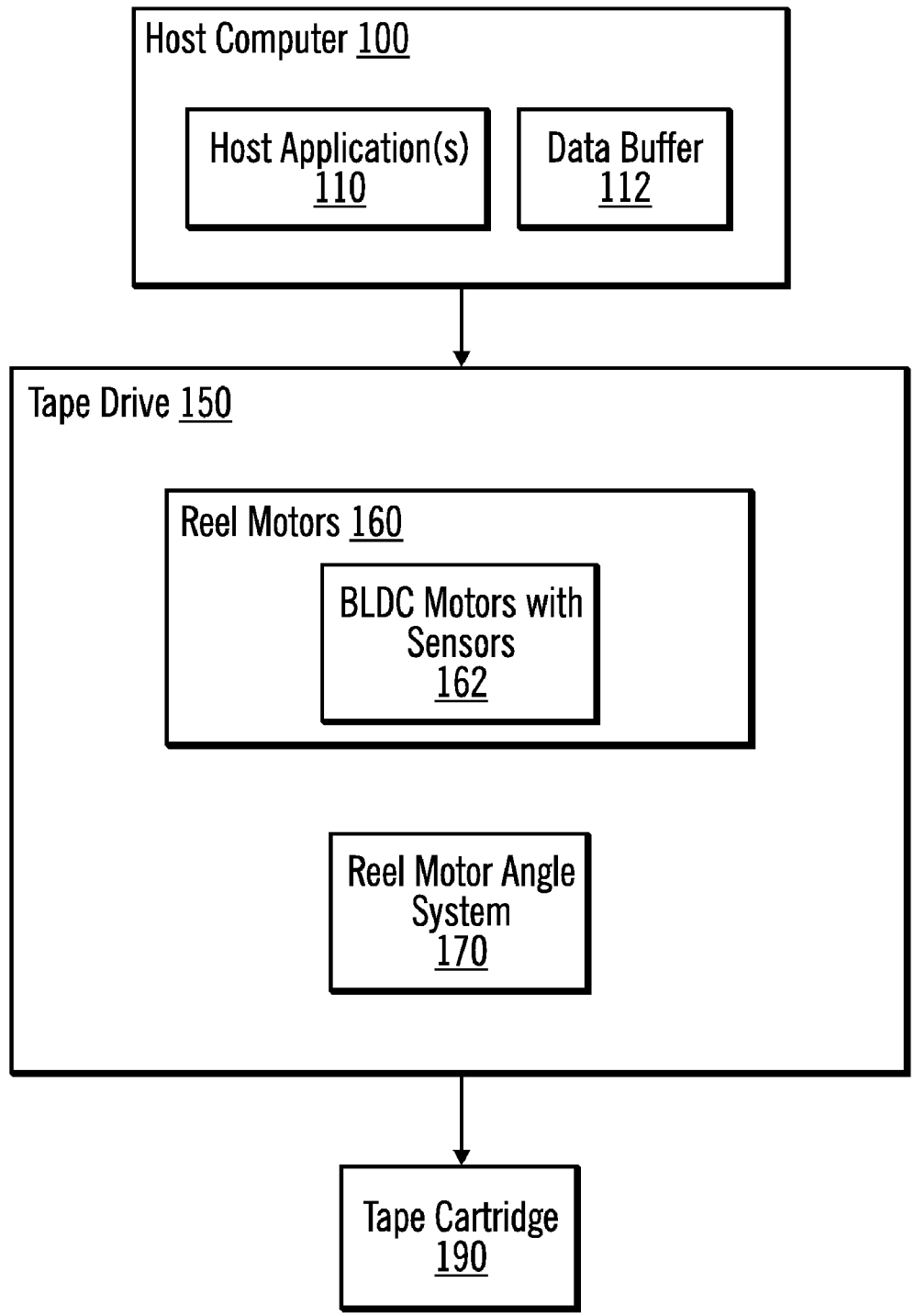
FIG. 1 illustrates, in a block diagram, a computing environment in accordance with certain embodiments.

FIG. 1 illustrates, in a block diagram, a computing environment in accordance with certain embodiments. A host computer 100 is coupled to a tape drive 150. Although the host computer 100 is shown as being directly coupled to the tape drive 150, in alternative embodiments, the host computer 100 may be coupled to a virtual tape server or storage controller that is coupled to the tape drive 150. The host computer 100 includes one or more host applications 110 and a data buffer 112.

The tape drive 150 includes BrushLess DC (BLDC) motors with sensors 162 (i.e., reference angle sensors) for commutation for the reel motors 160. The tape drive also includes a reel motor angle system 170. A reference angle sensor (e.g., reference angle sensor 370 in FIG. 3) is also often used in tape drive reel motor control systems. Often, this reference angle sensor is used for an electronic commutation motor control technique, also called a six step control. This reference angle sensor may be, for example, an optical sensor that detects a notch in the tape reel, or a hall sensor (also referred to as a hall effect sensor) that detects a magnetic field transition as the motor's permanent magnets cross the hall sensor.

Figure 2:
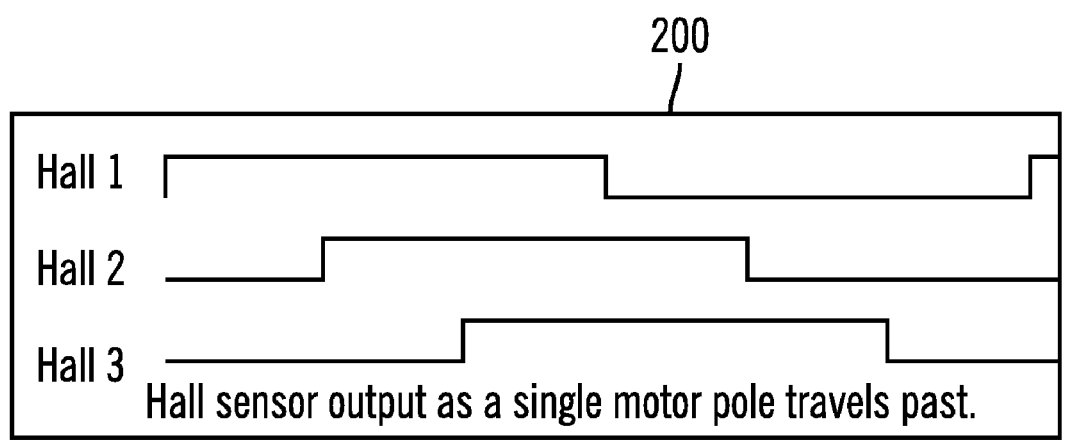
FIG. 2 illustrates a graph of hall sensor output in accordance with certain embodiments.

FIG. 2 illustrates a graph 200 of hall sensor output in accordance with certain embodiments. The hall sensors are an example of sensors 162. The hall sensors change state as the poles of a motor pass by. This pattern repeats for each pole within the motor (e.g., if there are 8 poles in the motor, there are 8 rising edges on each of the hall sensors). Given that the number of poles within a motor is a design constraint and is known a full revolution of the motor can be determined by counting the rising (or falling) edges on a hall sensor.

Figure 3:
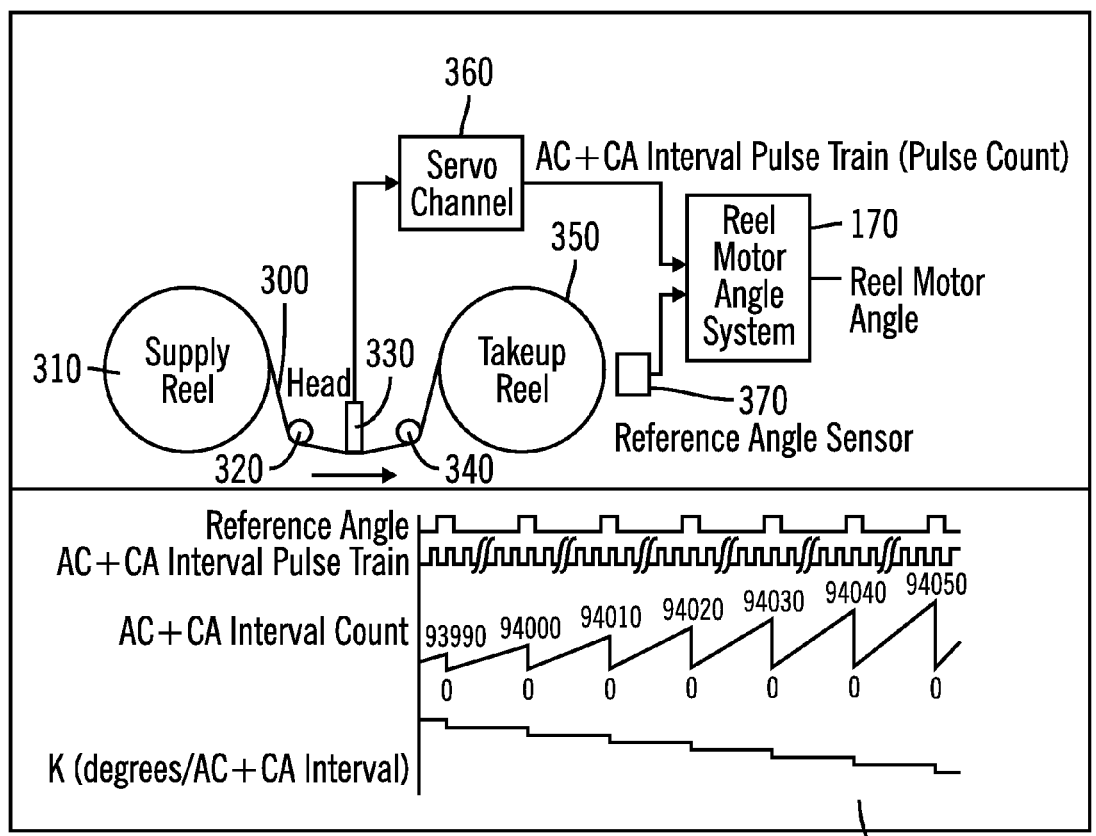
FIG. 3 illustrates a tape drive layout in accordance with certain embodiments.

FIG. 3 illustrates a tape drive layout in accordance with certain embodiments. Timing based servo formatted tape 300 is wound on a supply reel 310 and is wound by roller 320, head 330 (also referred to as "servo read head"), and roller 340 to takeup reel 350. Although not shown, a reel motor (an example of a reel motor 160) is attached to the takeup reel 350. During normal operation, the head 330 reads the servo format that is on the tape 300. Servo format may be described as magnetic transitions written on the tape. The servo format may also be described as a sub micron array that is written on the tape at the time the tape is manufactured. The head 330 is locked onto the servo format to make sure that it is reading the tape properly.

Tape motion is from supply reel 310, across roller 320, across head 330, across another roller 340, to takeup reel 350. The head 330 detects a servo pattern and sends a servo signal to the servo channel 360. The servo signal may be described as an analog signal that is generated by the head 330 as the head 330 crosses a servo stripe on tape 300. The servo pattern corresponds to data stripes and can be interpreted by the servo channel 160. In certain embodiments, the servo channel 160 detects symbols A, B, C, and D from the servo signal. As an example, the servo channel 160 may output a pulse every time an AC or CA interval occurs. The servo pattern is described below in further detail with reference to FIG. 5. This train of pulses can be counted to form a pulse count. At the same time, the signals from the reference angle sensor 370 are being processed by the reel motor angle system 170.

The reel motor angle system 170 receives indications (e.g., pulses) from the servo channel 360 and indications (e.g., pulses) of a beginning and end of an angular measurement interval from the reference angle sensor 370. Note that the indication of the end of one angular measurement interval may also indicate the beginning of a new angular measurement interval.

In certain embodiments, a pulse is generated by the reference angle sensor 370 each time the takeup reel 350 completes a full 360 degree revolution to indicate the end of the previous angular measurement interval and the beginning of a new angular measurement interval. The servo channel 360 outputs pulses or some other indication of when an AC or CA transition is detected. The reel motor angle system 170 uses the output of the servo channel 360 and the output of the reference angle sensor 370 to generate and output a new estimate of an interval to degrees translation factor K ("estimate K"). The reel motor angle system 170 also uses the output of the servo channel 360, the output of the reference angle sensor 370, and a previous best estimate K to output the reel motor angle.

A reel motor angle may also be referred to as an angular position of a tape reel because the reel motor may be attached to the takeup reel. In certain embodiments, an angle of the takeup reel is detected, and this angle is translated into the reel motor angle, which is typically a fixed angle offset that may be controlled during manufacturing or detected or calibrated in the tape drive.

Figure 4:
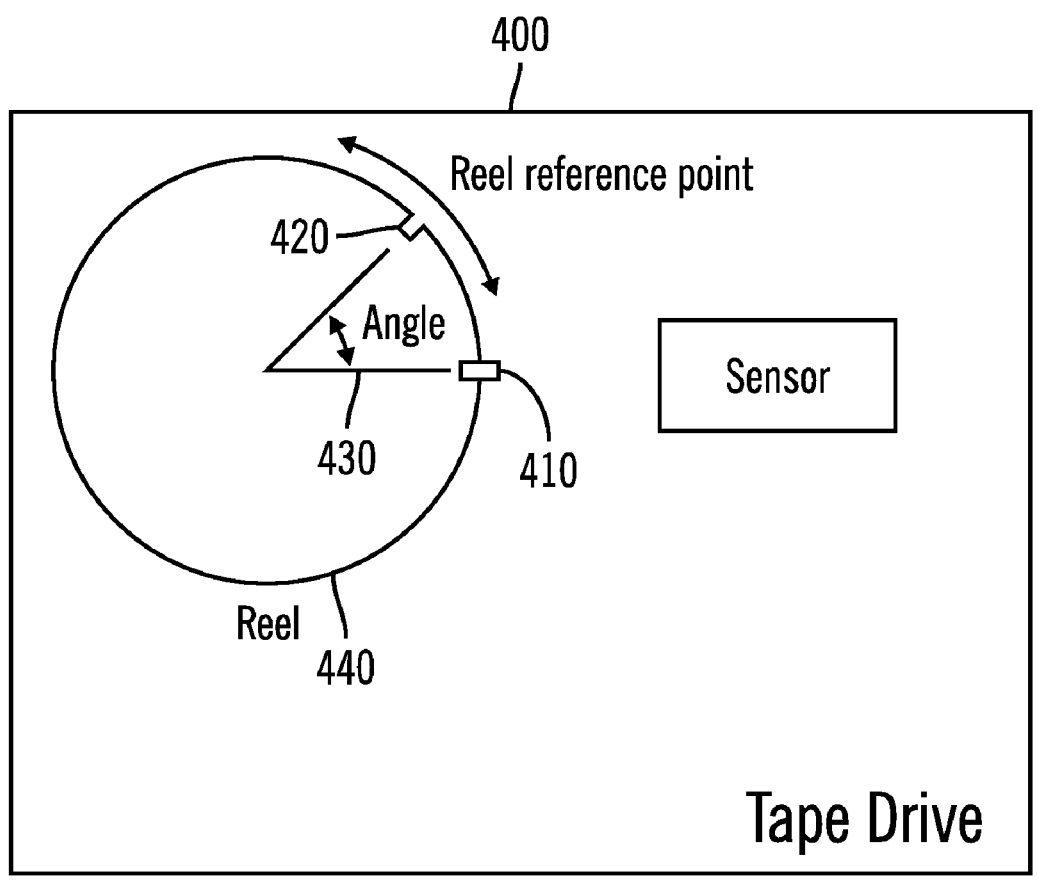
FIG. 4 illustrates a stationary reference point and a rotating reference point in accordance with certain embodiments.

FIG. 4 illustrates a stationary reference point and a rotating reference point in accordance with certain embodiments. To implement motor control techniques, embodiments identify an angle between a motor rotor (i.e., the part of the motor that rotates) and a motor stator (i.e., the part of the motor that is stationary). The motor stator is attached to the tape drive 400, so it is sufficient to measure the angle between the tape drive 400 and the rotor. There is a stationary reference point 410 on the tape drive 400. In certain embodiments, the stationary reference point may be arbitrarily selected as long as the stationary reference point does not move in relation to the motor stator. In FIG. 4, the stationary reference point 410 is a sensor (e.g., an optical sensor). There is a rotating reference point 420 (e.g., a notch) connected to the motor rotor. The rotating reference point 420 has a known fixed position relative to the motor rotor. Then, the angle 430 between these two reference points 410, 420 is measured. The takeup reel is directly attached to the takeup reel motor, so embodiments are capable of detecting the angle 430 between the tape drive and the takeup reel. The supply reel, however, is inside a tape cartridge, so the relationship of the supply reel with the supply reel motor is not necessarily known. For this supply reel motor, embodiments may use hall effect sensors to sense the supply reel motor's rotor position.

In FIG. 4, the sensor (representing the stationary reference point 410) is stationary, and a notch (representing the rotating reference point 420) in the reel 440 rotates with the motor. When the sensor detects the notch, the sensor sends a signal to the reel motor angle system 170 to indicate that the two reference points are aligned.

That is, when the stationary reference point 410 (sensor) and the rotating reference point 420 (notch or motor magnetic pole) cross, the exact angle between the motor rotor and motor stator (where the exact angle is referred to as the reference angle) is known at this time. At all other points in the reel motor's rotation, this angle between the motor rotor and the motor stator is being estimated.

The reference angle sensor 370 detects the occurrence of a particular reference angle. The reference angle sensor 370 sends out a signal (i.e., a pulse or some other indicator) to the reel motor angle system 170 in response to detecting that a particular event has occurred. The reel motor angle system 170 receives this signal and recognizes that this event has occurred. The reel motor angle system 170 knows that when this event occurs, the angle between the motor rotor and the motor stator is currently "x" degrees, where "x" is predetermined. That is, the reference angle is designed into the system and depends upon where the actual reference angle sensor 370 is mounted in the drive, and what the sensor is sensing, and how those two elements relate to the actual motor pole/winding positions. For example, when a hall effect sensor detects every 8th motor pole, the reel motor angle system 170 knows that the reference angle=27 degrees. Or, for example, when the optical sensor detects a slot in the takeup reel, the optical sensor sends a signal to the reel motor angle system 170, and the reel motor angle system 170 recognizes that the reference angle, 277 degrees, has occurred. In certain embodiments, a pulse is generated by the reference angle sensor 370 each time the reel motor (attached to the takeup reel 350) completes a full 360 degree revolution.

In FIG. 3, graph 380 illustrates, for a reference angle, an AC+CA interval pulse train, an AC+CA interval count, and an estimate K.

Tape drives have servo tracks written along the entire length of the tape media. The servo patterns formed by the servo tracks are used for head positioning, track following, linear tape position, and tape speed control, and are very accurate. Typically, the servo pattern consists of symbols written with precise distances between them. Counting the number of occurrences of a symbol can then be translated into a precise distance between those symbols. For example, timing based servo consists of four symbols, written A B C D A B C D . . . . The distance from symbol A to C is 100 microns. The distance from symbol C to A is 100 microns. The distance between two points on tape can be calculated from the number of A symbol to C symbol intervals (AC) and the number of C symbol to A symbol intervals (CA). Distance=(AC+CA) *100 microns.

Figure 5:
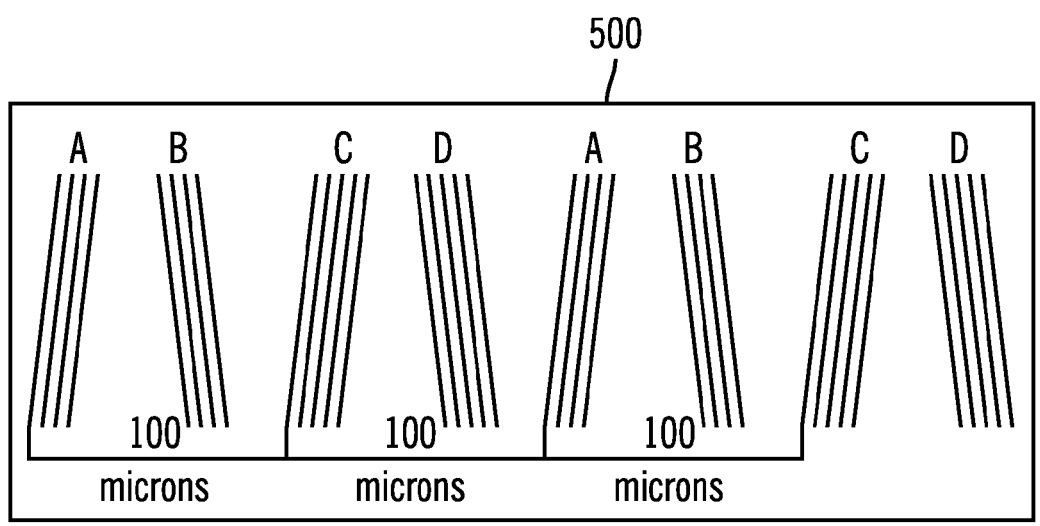
FIG. 5 illustrates a representation of a servo format on a tape in accordance with certain embodiments.

FIG. 5 illustrates a representation 500 of a servo format on a tape in accordance with certain embodiments. In FIG. 5, the "A" and "C" lines are parallel. Although the lines are "straight" lines in FIG. 5, in various embodiments, the lines may not be straight (e.g., may form chevron stripes). The distance between a first line in an "A" set of lines and a first line in a subsequent "C" set of lines is 100 microns. Also, the distance between a first line in a "C" set of lines and a first line in a subsequent "A" set of lines is 100 microns.

U.S. Pat. No. 5,689,384, issued on Nov. 18, 1997, describes a timing based servo system for magnetic tape systems and is incorporated herein by reference in it entirety. A servo format may also be described as a servo pattern. A servo format comprises magnetic flux transitions that extend across the width of a servo track such that the servo read head signal produced by reading the servo format varies continuously as the servo read head is moved across the width of each servo track.

With reference to the servo format illustrated in FIG. 5, those skilled in the art will recognize that the dark vertical bands, hereafter called stripes, represent magnetized areas of recorded magnetic flux that extend across the width of a servo track and that the edges of the stripes comprise flux transitions that are detected to generate the servo read head signal. The transitions have two magnetic polarities, one on each edge of a stripe. When the servo read head crosses a transition, it produces a pulse whose polarity is determined by the polarity of the transition. For example, the servo head might produce positive pulses on the leading edge of each stripe (on encountering a stripe) and negative pulses on the trailing edge (on leaving a stripe). Each servo format comprises a repeating sequence of different stripes having at least two orientations across the width of the track such that the first orientation is not parallel to the second orientation.

With the servo format illustrated in FIG. 5, a magnetic servo read head that is positioned above the tape as the tape is moved linearly with respect to the head in the transducing direction generates an analog servo read head signal having peaks whose peak-to-peak timing varies as the head is moved across the width of the track in the translating direction. The variation in timing is used to determine the relative position of the magnetic servo read head within the servo track.

The servo format illustrated in FIG. 5 includes stripes that define intervals that are used to generate a position signal that is independent of tape speed. The position signal is generated by timing the intervals and calculating their ratio. The timing intervals from "A" to "C" and from "C" to "A" are constant, regardless of position.

In certain embodiments, it is possible to interpolate to less than 100 microns using the individual strips within a burst. In certain embodiments, rather than using "AC" bursts, "BD" bursts or other parallel lines may be used.

Embodiments use the servo pattern written on tape in combination with one or more reference angles to calculate the reel motor angle (i.e., angular position) directly from a count of the number of AC+CA intervals that occur over that interval. This angular position can then be used for field oriented motor control of the reel motors.

Figure 6:
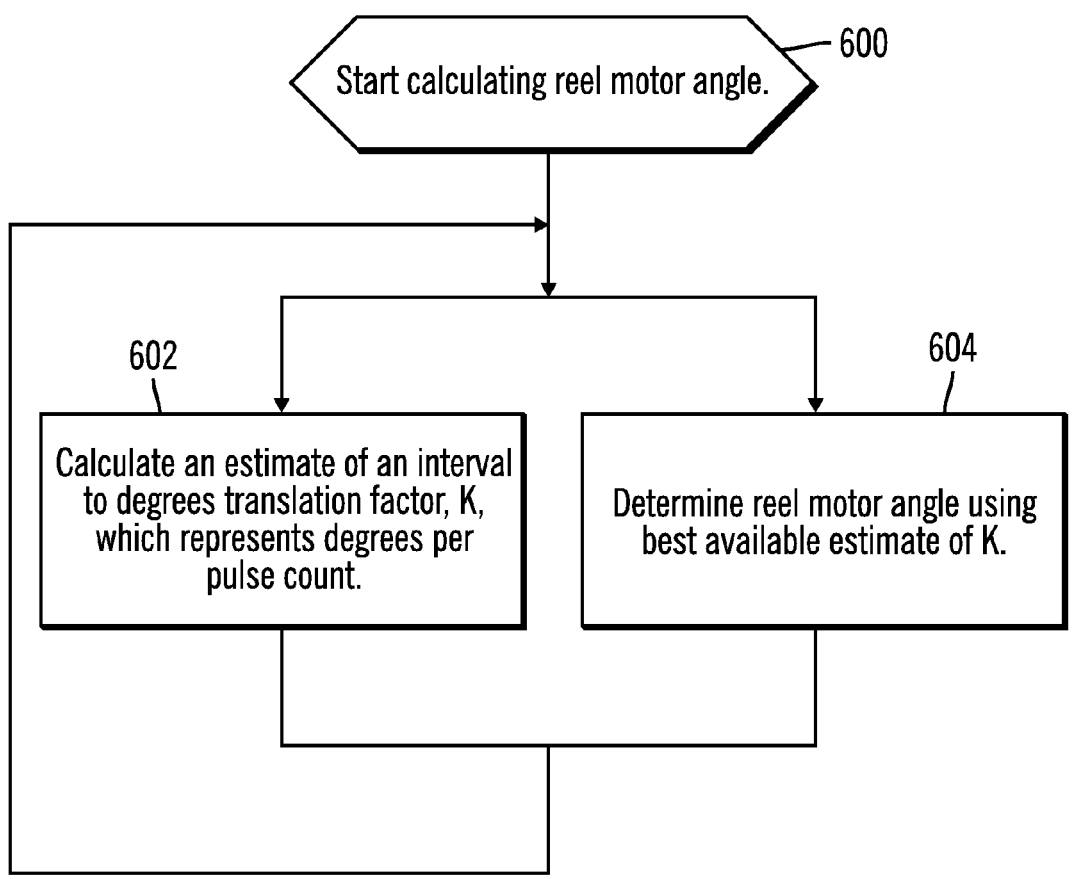
FIG. 6 illustrates logic performed by a reel motor angle system for calculating a reel motor angle in accordance with certain embodiments.

FIG. 6 illustrates logic performed by the reel motor angle system 170 for calculating an angular position in accordance with certain embodiments. Control begins at block 600 with the reel motor angle system 170 starting to calculate the reel motor angle.

With embodiments, there are two processes that are running at a same time (i.e., in parallel). In block 602, the reel motor angle system 170 calculates an estimate of an interval to degrees translation factor, "estimate K", which represents degrees per pulse count (i.e., count of AC or CA transitions during an angular measurement interval). In block 604, the reel motor angle system 170 uses the best available estimate K to determine a reel motor angle.

In certain embodiments, the angular measurement interval is predetermined (e.g., designed into the system). In certain embodiments, the sensors 162 are stationary. For example, an optical sensor attached to a tape drive deck could detect a notch on a takeup reel once per revolution. As another example, if there were 10 notches at equal distances around the takeup reel, then the angular measurement interval could be 1/10 of a revolution. With more angular measurement intervals per revolution, embodiments enable updating the estimate K more often, which may increase accuracy. That is, embodiments calculate an estimate K that is accurate for a given diameter of the takeup reel 350. The diameter is changing as the tape is wound or unwound from the takeup reel 350. In embodiments in which the tape is thin, then the diameter change of one revolution is so small that the estimate K is still accurate after one revolution, so updating the estimate K once per revolution may be acceptable. In certain embodiments in which the tape is very thick, it may be preferable to update the estimate K several times per revolution. In certain embodiments, one estimate K per revolution of the takeup reel 350 is sufficient.

Another way to determine angular measurement intervals is to use one or more stationary hall sensors to detect the magnetic poles of the motor as the motor rotates.

Figure 7:
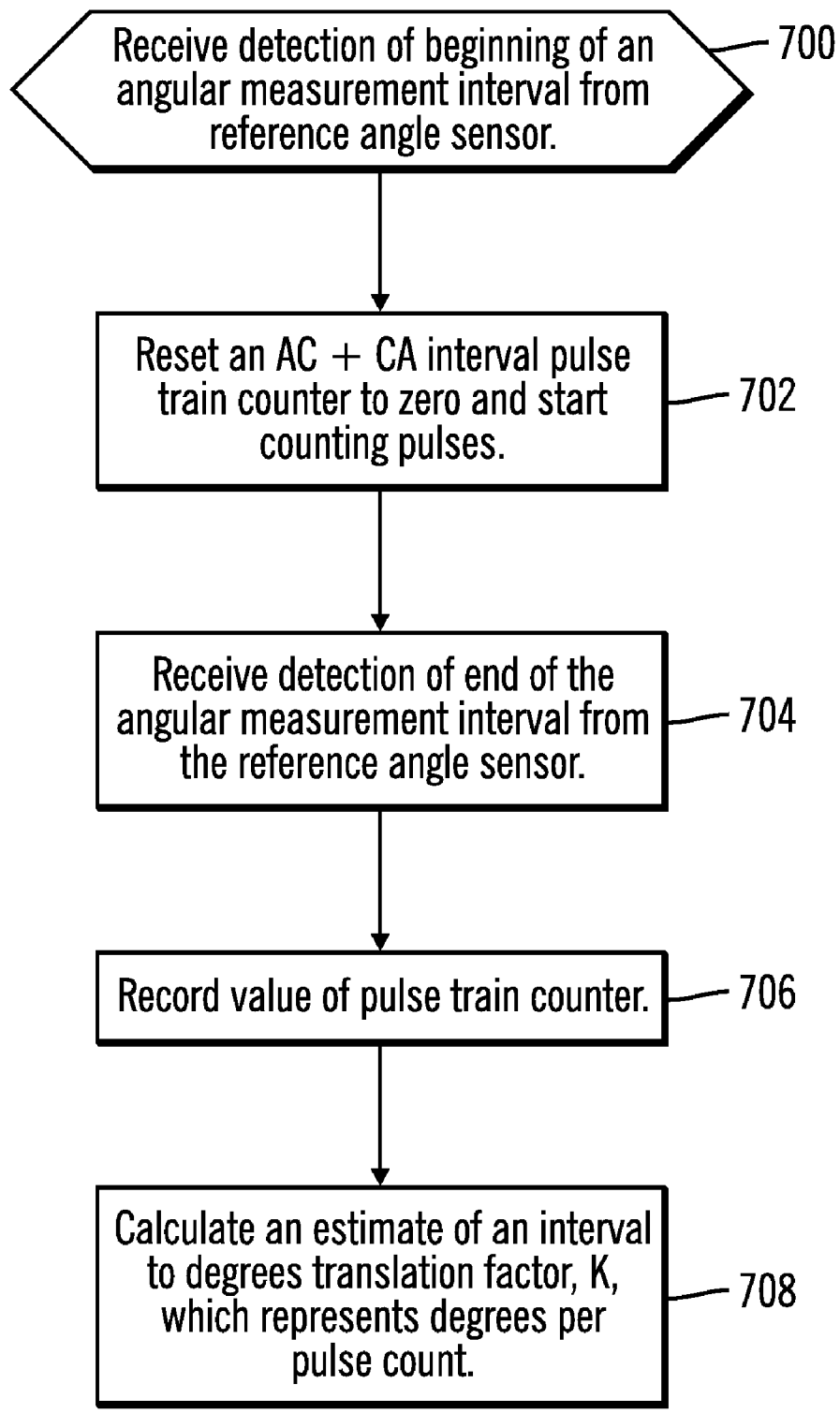
FIG. 7 illustrates logic for calculating an estimate K in accordance with certain embodiments.

FIG. 7 illustrates logic for calculating the estimate K in accordance with certain embodiments. In particular, to calculate the estimate K, the reference angle sensor 370 detects the beginning of an angular measurement interval. In block 700, the reel motor angle system 170 receives the detection of the beginning of the angular measurement interval from the reference angle sensor 370. In block 702, the reel motor angle system 170 resets an AC+CA interval pulse train counter to zero and starts counting pulses. The pulse count represents the number of AC or CA intervals that have occurred since the start of the angular measurement interval. The reference angle sensor 370 also detects the end of the angular measurement interval and sends a signal to the reel motor angle system 170. In block 704, the reel motor angle system 170 received detection of the end of the angular measurement angle from the reference angle sensor 370. In block 706, the reel motor angle system 170 records the pulse count (i.e., a value) in the interval pulse train counter. In block 708, the reel motor angle system 170 calculates an estimate of an interval to degrees translation factor, "estimate K", which represents degrees per pulse count (i.e., count of AC or CA transitions during an angular measurement interval) with equation 1.

$$K = \text{Measurement Interval Angle (in degrees)}/\text{First pulse count (representing format transitions counted during angular measurement interval)}. \quad \text{Equation 1}$$

The measurement interval angle may be any possible angle between one or more rotating reference points (fixed in angular position relative to the motor rotor), which reference points can be sensed by a sensor at another stationary reference point (which stationary reference point is fixed in angular position relative to the motor stator).

So, if there is one rotating reference point, then possible measurement interval angles are 360, 720, ... degrees. If there are two rotating reference points, then possible measurement interval angles are the angles from point 1 to point 2, or from point 2 to point 1, etc.

In certain embodiments, the format transitions are the number of A-C transitions (#AC) and number of C-A transitions (#CA) that pass head 330. As an example, assume that the pulse train is counted over one complete revolution of 360 degrees. If 94000 pulses are counted during that interval, then the estimate K=360/94000.

Figure 8:
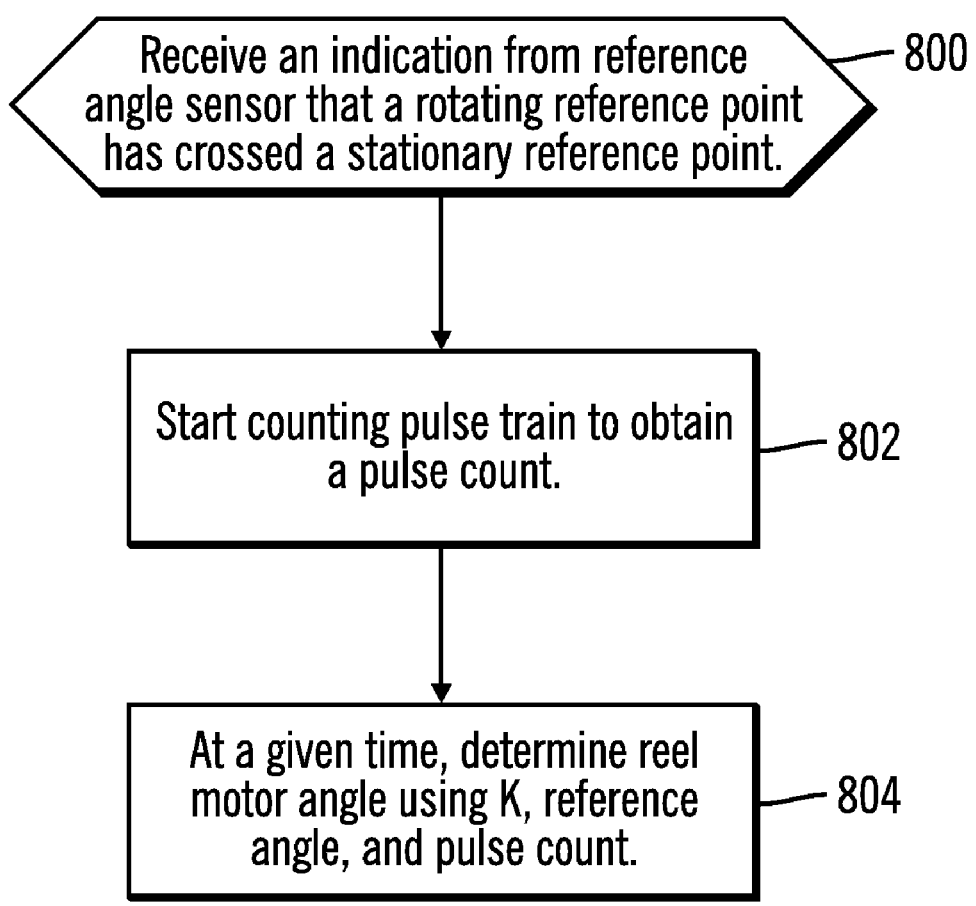
FIG. 8 illustrates logic for determining a reel motor angle in accordance with certain embodiments.

FIG. 8 illustrates logic for determining a reel motor angle in accordance with certain embodiments. In block 800, the reel motor angle system 170 receives an indication from the reference angle sensor 370 that a rotating reference point has crossed a stationary reference point, at which point the reel motor angle system 170 understands that the angle 430 is the reference angle. In block 802, the reel motor angle system 170 starts counting a pulse train to obtain a second pulse count representing format transitions counted since the indication was received from the reference angle sensor 370 to a given point in time (block 802). An example of a reference angle may be 60 degrees.

The angular measurement interval may be determined by accuracy requirements and by how much the diameter of the takeup reel changes within that measurement interval. For example, to measure the reel motor angle to within 1% accuracy, then the estimate K should be accurate to 1% or better within the measurement interval. The estimate K may be determined more frequently based on the desired accuracy. In certain embodiments, the takeup reel diameter changes very little with one rotation, so one estimate K per revolution provides enough accuracy for motor control.

When the takeup reel is of smallest diameter, the percent change of the diameter with one rotation will be greatest. If, for example, this was a 1" diameter, that is 2*pi*1=6.28"=6.28 million microns for the circumference of one wrap of the takeup reel. One AC or CA interval might be 100 microns, so that would be 6.28 million/100=62800 intervals in one revolution. If the servo channel output one pulse per AC or CA interval, and the measurement interval was 360 degrees, then that is a resolution of 360/62800=0.0057 degrees per pulse, which may be more accurate than desired for motor control.

In addition, there may be an error factor for the estimate K. For example, if the diameter were 1"=1 million microns, after one revolution there would be two tape thicknesses to the diameter. Tape thickness today is less than 10 microns, so the new diameter might be 1000020. This is an error of 20/1000000*100=0.002%, which is a very small error. So the estimate K is very accurate over one revolution of the takeup reel.

In block 804, at a given time, the reel motor angle system 170 calculates the reel motor angle with equation 2 using K, the reference angle, and the second pulse count.

$$\text{Reel motor angle} = \text{reference angle (in degrees)} + \text{second pulse count} * K(\text{degrees}/\text{first pulse count}). \quad \text{Equation 2}$$

For example, assume that the reference angle=60 degrees and the estimate K=360 degrees/94000 pulse count. In this example, when 262 AC+CA intervals are counted since the motor crossed the 60 degree angle, then the reel motor angle is: 60 degrees+262 pulse count*360 degrees/94000 pulse count=61 degrees.

In certain embodiments, the reel motor angle system 170 calculates a value for degrees of rotation per AC or CA interval detected. At first angle 1, θ1, the reel motor angle system 170 resets AC and CA counters to zero. The reel motor angle system 170 starts counting AC and CA intervals. At second angle 2, θ2, the reel motor angle system 170 stops counting AC and CA intervals and calculates the estimate K using equation 3:

$$K = (\theta 2 - \theta 1)/(\text{Count of AC+CA Intervals}) \quad \text{Equation 3}$$

where units are degrees/pulse count

Then, the reel motor angle system 170 calculates a current reel motor angle using Equation 2, a reference angle, the estimate K, and the AC and CA interval count representing the second pulse count.

When a reference angle, θn, is detected, the reel motor angle system 170 resets a counter to zero and starts counting the number of AC and CA intervals to obtain the second pulse count. The reel motor angle system 170 calculates the reel motor angle, θ, using equation 4:

$$\text{Reel motor angle} = \theta = \theta n + K * (\text{Current AC+CA count}) \quad \text{Equation 4}$$

The reel motor angle system 170 continues to update the estimate K.

Thus, embodiments use an angular position in % of a full rotation=(current AC+CA count)/(AC+CA of previous rotation+correction). In certain embodiments, correction could be the difference in AC+CA counts of the last two full revolutions. For example if AC+CA counts of previous rotations were 1000, 1010, 1020, 1030, then the current angle % would be (current AC+CA count)/(1030+10).

In other words, a correction enables predicting the future change in the estimate K based on previous observations on how the estimate K changes. So, if the angular measurement interval is one revolution, then a new estimate K is determined at the end of every full revolution. This estimate K is based off the number of AC and CA intervals that were counted in that full revolution. For example, assuming that two revolutions ago, AC+CA was 400,000, and in the previous revolution, AC+CA count was 400,005, it is possible to predict that in the next revolution, AC+CA count will be 400,005+(400,005−400,000)=400,010.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device). Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 6, 7, and 8 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 6, 7, and 8 may be implemented in software, hardware, programmable and non-programmable gate array logic or in some combination of hardware, software, or gate array logic.

Figure 9:
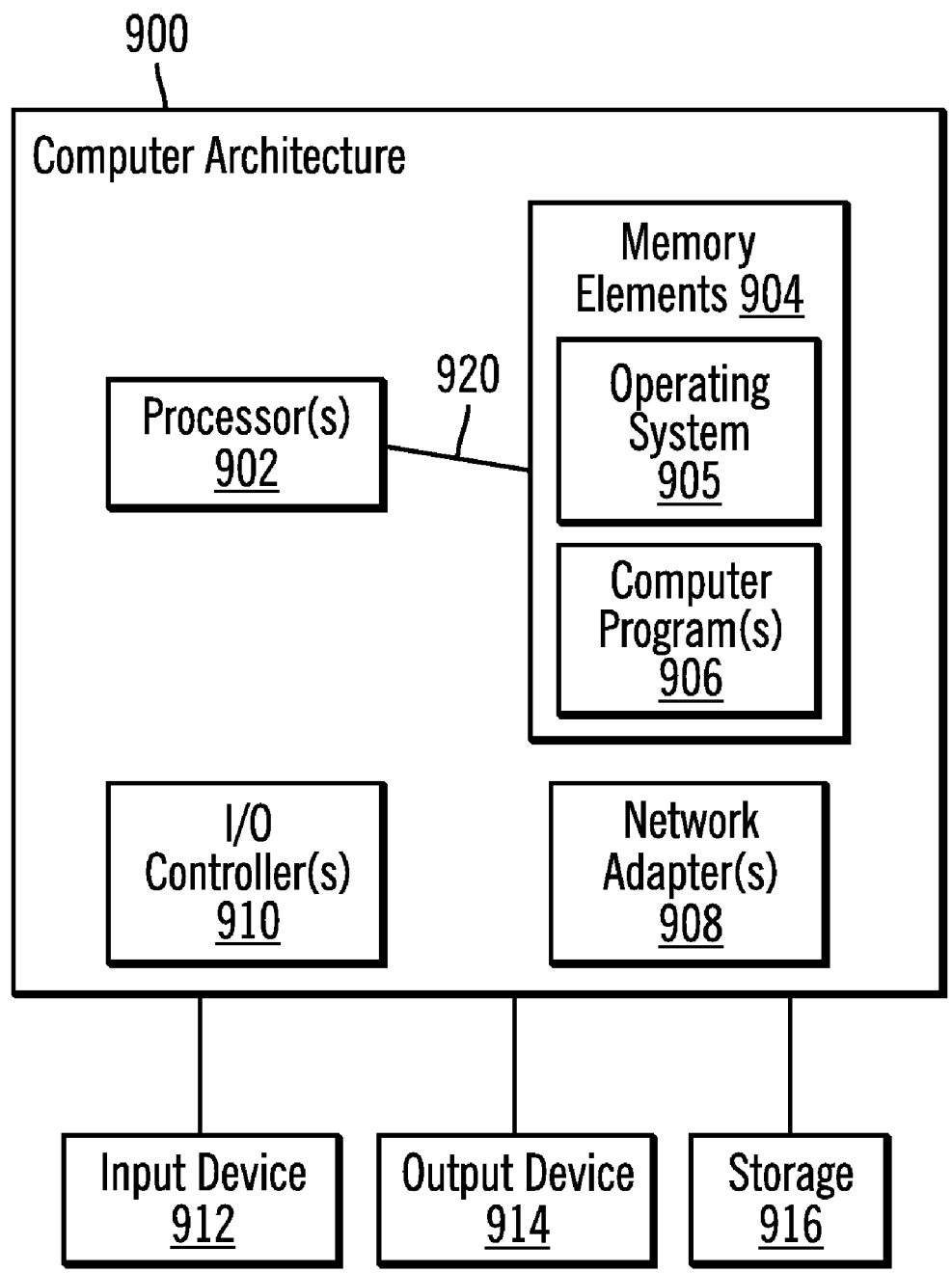
FIG. 9 illustrates a system architecture that may be used in accordance with certain embodiments.

FIG. 9 illustrates a system architecture 900 that may be used in accordance with certain embodiments. Client computer 100 and/or server computer 120 may implement system architecture 900. The system architecture 900 is suitable for storing and/or executing program code and includes at least one processor 902 coupled directly or indirectly to memory elements 904 through a system bus 920. The memory elements 904 may include local memory employed during actual execution of the program code, bulk storage, and cache memories which provide temporary storage of at least some program code in order to reduce the number of times code must be retrieved from bulk storage during execution. The memory elements 904 include an operating system 905 and one or more computer programs 906.

Input/Output (I/O) devices 912, 914 (including but not limited to keyboards, displays, pointing devices, etc.) may be coupled to the system either directly or through intervening I/O controllers 910.

Network adapters 908 may also be coupled to the system to enable the data processing system to become coupled to other data processing systems or remote printers or storage devices through intervening private or public networks. Modems, cable modem and Ethernet cards are just a few of the currently available types of network adapters 908.

The system architecture 900 may be coupled to storage 916 (e.g., a non-volatile storage area, such as magnetic disk drives, optical disk drives, a tape drive, etc.). The storage 916 may comprise an internal storage device or an attached or network accessible storage. Computer programs 906 in storage 916 may be loaded into the memory elements 904 and executed by a processor 902 in a manner known in the art.

The system architecture 900 may include fewer components than illustrated, additional components not illustrated herein, or some combination of the components illustrated and additional components. The system architecture 900 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:
1. A computer-implemented method, comprising:
  calculating an estimate of an interval to degrees translation factor that represents a measurement angle interval divided by a first pulse count, wherein the first pulse count represents magnetic format transitions counted during an angular measurement interval, wherein a servo format is formed by the magnetic format transitions written on a tape medium, wherein the measurement angle interval is determined with a reference angle sensor; and determining a reel motor angle using the estimate by:
receiving an indication that a rotating reference point has crossed a stationary reference point, wherein the indication is recognized as indicating that an angle between a motor rotor and a motor stator is a reference angle;

determining a second pulse count, wherein the second pulse count represents magnetic format transitions counted since the indication was received to a given point in time; and at the given point in time,
multiplying the second pulse count by the estimate to generate a first value; and
adding the reference angle to the first value to generate the reel motor angle.

2. The method of claim 1, farther comprising:
calculating the estimate and determining the reel motor angle in parallel, wherein the reel motor angle is determined using a best available estimate.

3. The method of claim 1, wherein the measurement angle interval is some angle in degrees among possible angles formed between one or more rotating reference points that are fixed in angular position relative to the motor rotor, wherein the one or more rotating reference points are sensed by a sensor at the stationary reference point that is fixed in angular position relative to the motor stator.

4. The method of claim 1, wherein calculating the estimate further comprises:
detecting a beginning of the angular measurement interval;
resetting an interval pulse train counter;
starting to count pulses by updating the interval pulse train counter with a number of magnetic format transitions that occur since the beginning of the angular measurement interval;
detecting an end of the angular measurement interval; and
recording the first pulse count in the interval pulse train counter.

5. The method of claim 1, further comprising:
determining the angular measurement interval in response to receiving an indication from a sensor of a beginning and an end of the angular measurement interval.

6. The method of claim 1, wherein determining a second pulse count further comprises:
receiving pulses from a servo channel that detects a magnetic format transition.

7. A computer program product comprising a computer-readable storage medium storing a computer readable program, wherein the computer readable program when executed by a processor on a computer causes the computer to:
calculate an estimate of an interval to degrees translation factor that represents a measurement angle interval divided by a first pulse count, wherein the first pulse count represents magnetic format transitions counted during an angular measurement interval, wherein a servo format is formed by the magnetic format transitions written on a tape medium, wherein the measurement angle interval is determined with a reference angle sensor; and determine a reel motor angle using the estimate by:
receiving an indication that a rotating reference point has crossed a stationary reference point, wherein the indication is recognized as indicating that an angle between a motor rotor and a motor stator is a reference angle;

determining a second pulse count, wherein the second pulse count represents magnetic format transitions counted since the indication was received to a given point in time; and at the given point in time,
multiplying the second pulse count by the estimate to generate a first value; and
adding the reference angle to the first value to generate the reel motor angle.

8. The computer program product of claim 7, wherein the computer readable program when executed on a computer causes the computer to:
calculate the estimate and determining the reel motor angle in parallel, wherein the reel motor angle is determined using a best available estimate.

9. The computer program product of claim 7, wherein the measurement angle interval is some angle in degrees among possible angles formed between one or more rotating reference points that are fixed in angular position relative to the motor rotor, wherein the one or more rotating reference points are sensed by a sensor at the stationary reference point that is fixed in angular position relative to the motor stator.

10. The computer program product of claim 7, wherein the computer readable program when executed on a computer causes the computer to calculate the estimate by:
detecting a beginning of the angular measurement interval;
resetting an interval pulse train counter;
starting to count pulses by updating the interval pulse train counter with a number of magnetic format transitions that occur since the beginning of the angular measurement interval;
detecting an end of the angular measurement interval; and
recording the first pulse count in the interval pulse train counter.

11. The computer program product of claim 7, wherein the computer readable program when executed on a computer causes the computer to:
determine the angular measurement interval in response to receiving an indication from a sensor of a beginning and an end of the angular measurement interval.

12. The computer program product of claim 7, wherein the computer readable program when executed on a computer causes the computer to determine a second pulse count by:
receiving pulses from a servo channel that detects a magnetic format transition.

13. A system, comprising:
a processor; and
an integrated circuit performing operations, the operations comprising:
calculating an estimate of an interval to degrees translation factor that represents a angle interval divided by a first pulse count, wherein the first pulse count represents magnetic format transitions counted during an angular measurement interval, wherein a servo format is formed by the magnetic format transitions written on a tape medium, wherein the measurement angle interval is determined with a reference angle sensor; and determining a reel motor angle using the estimate by:
receiving an indication that a rotating reference point has crossed a stationary reference point, wherein the indication is recognized as indicating that an angle between a motor rotor and a motor stator is a reference angle;

determining a second pulse count, wherein the second pulse count represents magnetic format transitions counted since the indication was received to a given point in time; and at the given point in time, multiplying the second pulse count by the estimate to generate a first value; and adding the reference angle to the first value to generate the reel motor angle.

14. The system of claim 13, wherein the operations further comprise: calculating the estimate and determining the reel motor angle in parallel, wherein the reel motor angle is determined using a best available estimate.

15. The system of claim 13, wherein the measurement angle interval is some angle in degrees among possible angles formed between one or more rotating reference points that are fixed in angular position relative to the motor rotor, wherein the one or more rotating reference points are sensed by a sensor at the stationary reference point that is fixed in angular position relative to the motor stator.

16. The system of claim 13, wherein operations for calculating the estimate further comprise:

detecting a beginning of the angular measurement interval; resetting an interval pulse train counter;

starting to count pulses by updating the interval pulse train counter with a number of magnetic format transitions that occur since the beginning of the angular measurement interval;

detecting an end of the angular measurement interval; and recording the first pulse count in the interval pulse train counter.

17. The system of claim 13, wherein the operations further comprise:

determining the angular measurement interval in response to receiving an indication from a sensor of a beginning and an end of the angular measurement interval.

18. The system of claim 13, wherein operations for determining a second pulse count further comprise:

receiving pulses from a servo channel that detects a magnetic format transition.

* * * * *